United States Patent
Klingmann et al.

(10) Patent No.: US 9,486,793 B2
(45) Date of Patent: Nov. 8, 2016

(54) START-UP CATALYST FOR USE UPSTREAM OF A GASOLINE PARTICULATE FILTER

(71) Applicant: Umicore AG & CO. KG, Hanau-Wolfgang (DE)

(72) Inventors: Raoul Klingmann, Alzenau (DE); Joel Despres, Rodenbach (DE); Martin Roesch, Rodgau (DE); Joerg-Michael Richter, Frankfurt (DE); Stephanie Spiess, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/405,768

(22) PCT Filed: Jun. 5, 2013

(86) PCT No.: PCT/EP2013/001644
§ 371 (c)(1),
(2) Date: Dec. 4, 2014

(87) PCT Pub. No.: WO2013/182302
PCT Pub. Date: Dec. 12, 2013

(65) Prior Publication Data
US 2015/0125370 A1 May 7, 2015

Related U.S. Application Data

(60) Provisional application No. 61/690,512, filed on Jun. 28, 2012.

(30) Foreign Application Priority Data

Jun. 6, 2012 (EP) ..................... 12171015

(51) Int. Cl.
| | | |
|---|---|---|
| B01D 53/34 | (2006.01) |
| B01D 53/56 | (2006.01) |
| B01D 53/94 | (2006.01) |
| B01D 50/00 | (2006.01) |
| B01J 8/02 | (2006.01) |
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 21/04 | (2006.01) |
| B01J 35/04 | (2006.01) |
| B01J 37/02 | (2006.01) |
| B01J 35/00 | (2006.01) |
| B01J 23/63 | (2006.01) |
| B01J 23/46 | (2006.01) |

(52) U.S. Cl.
CPC .............. *B01J 35/04* (2013.01); *B01D 53/945* (2013.01); *B01D 53/9454* (2013.01); *B01J 21/04* (2013.01); *B01J 23/464* (2013.01); *B01J 23/63* (2013.01); *B01J 35/0006* (2013.01); *B01J 35/0073* (2013.01); *B01J 37/024* (2013.01); *B01J 37/0244* (2013.01); *B01J 37/0248* (2013.01); *B01D 2255/1023* (2013.01); *B01D 2255/1025* (2013.01); *B01D 2255/2092* (2013.01); *B01D 2255/20715* (2013.01); *B01D 2255/407* (2013.01); *B01D 2255/9022* (2013.01); *B01D 2255/9207* (2013.01); *Y02T 10/22* (2013.01)

(58) Field of Classification Search
CPC .......... B01J 23/10; B01J 23/44; B01J 23/46; B01J 23/56; B01J 23/63; B01J 21/04; B01D 53/945; B01D 35/04
USPC ....... 502/302–304, 327, 332, 333, 339, 349, 502/355, 439, 527.12, 527.13, 527.19; 423/213.5; 422/169, 170, 177, 180
See application file for complete search history.

(56) References Cited

U.S. PATENT DOCUMENTS

| | | |
|---|---|---|
| 5,597,771 A | 1/1997 | Hu et al. |
| 6,044,644 A | 4/2000 | Hu et al. |

(Continued)

FOREIGN PATENT DOCUMENTS

| | | |
|---|---|---|
| CN | 1205652 A | 1/1999 |
| CN | 101479023 A | 7/2009 |

(Continued)

OTHER PUBLICATIONS

International Search Report for PCT/EP2013/001644 Dated Dec. 12, 2013 (3 pages).

(Continued)

*Primary Examiner* — Cam N. Nguyen
(74) *Attorney, Agent, or Firm* — Smith, Gambrell & Russell, LLP

(57) ABSTRACT

The present invention describes a double-layer three-way catalyst on an inert catalyst support comprising a first layer in direct contact with the inert catalyst support, comprising active alumina, a cerium/zirconium mixed oxide and palladium and a second layer applied to the first layer and in direct contact with the exhaust gas to be purified, comprising active alumina and rhodium, characterized in that the second layer is free of cerium and cerium containing materials, the use of such catalyst for cleaning the exhaust gases of a motor vehicle equipped with a gasoline engine and an exhaust gas treatment system comprising such catalyst up stream of a gasoline particulate filter (GPF).

12 Claims, No Drawings

(56) References Cited

U.S. PATENT DOCUMENTS

| | | | |
|---|---|---|---|
| 6,103,660 A | 8/2000 | Yperen et al. | |
| 6,254,842 B1 | 7/2001 | Hu et al. | |
| 6,497,851 B1 | 12/2002 | Hu et al. | |
| 6,764,665 B2* | 7/2004 | Deeba | B01D 53/865 423/213.5 |
| 7,517,510 B2* | 4/2009 | Chen | B01D 53/945 422/168 |
| 7,550,124 B2* | 6/2009 | Chen | B01D 53/945 422/168 |
| 7,622,096 B2 | 11/2009 | Deeba et al. | |
| 7,754,171 B2* | 7/2010 | Chen | B01D 53/945 423/213.2 |
| 7,758,834 B2* | 7/2010 | Chen | B01D 53/945 423/213.2 |
| 7,795,172 B2* | 9/2010 | Foong | B01D 53/945 502/302 |
| 7,879,755 B2* | 2/2011 | Wassermann | B01D 53/945 423/213.5 |
| 8,038,951 B2* | 10/2011 | Wassermann | B01J 21/066 422/168 |
| 8,057,745 B2* | 11/2011 | Toyoda | B01D 53/945 422/171 |
| 8,066,963 B2* | 11/2011 | Klingmann | B01D 53/944 423/212 |
| 8,227,374 B2* | 7/2012 | Sato | B01D 53/945 502/100 |
| 8,323,599 B2* | 12/2012 | Nunan | B01D 53/945 423/213.2 |
| 8,394,348 B1* | 3/2013 | Nunan | B01D 53/945 423/213.2 |
| 8,557,204 B2* | 10/2013 | Nunan | B01D 53/945 422/177 |
| 8,568,675 B2* | 10/2013 | Deeba | B01D 53/945 422/177 |
| 8,617,496 B2* | 12/2013 | Wei | B01J 23/63 423/213.2 |
| 8,640,440 B2* | 2/2014 | Klingmann | B01D 53/944 422/170 |
| 8,828,343 B2* | 9/2014 | Liu | B01D 53/945 423/213.5 |
| 8,833,064 B2* | 9/2014 | Galligan | B01D 53/945 423/213.5 |
| 8,968,690 B2* | 3/2015 | Nunan | B01D 53/945 422/177 |
| 2003/0061860 A1 | 4/2003 | Hu et al. | |
| 2003/0099583 A1 | 5/2003 | Ikeda et al. | |
| 2009/0193796 A1 | 8/2009 | Wei et al. | |
| 2010/0135879 A1 | 6/2010 | Roesch et al. | |
| 2010/0263357 A1 | 10/2010 | Lindner et al. | |
| 2010/0275579 A1 | 11/2010 | Klingmann et al. | |
| 2010/0293930 A1 | 11/2010 | Li et al. | |
| 2011/0030346 A1 | 2/2011 | Neubauer et al. | |
| 2011/0041486 A1 | 2/2011 | Kato et al. | |
| 2011/0072794 A1 | 3/2011 | Van Nieuwstadt et al. | |
| 2011/0120090 A1 | 5/2011 | Sorensen, Jr. | |
| 2011/0126527 A1 | 6/2011 | Hilgendorff | |
| 2015/0125371 A1 | 5/2015 | Schmidt et al. | |

FOREIGN PATENT DOCUMENTS

| | | |
|---|---|---|
| CN | 101528347 A | 9/2009 |
| CN | 102112211 A | 6/2011 |
| DE | 102009056681 | 7/2010 |
| EP | 0957064 | 11/1999 |
| EP | 1974809 | 10/2008 |
| EP | 2038046 | 3/2009 |
| EP | 2042225 A1 | 4/2009 |
| EP | 2 308 592 | 4/2011 |
| EP | 2 318 673 | 5/2011 |
| WO | 95/00235 | 1/1995 |
| WO | 97/23278 | 7/1997 |
| WO | 2008/000449 A2 | 1/2008 |
| WO | 2008113445 A1 | 9/2008 |
| WO | 2009/043390 | 4/2009 |
| WO | 2009/100097 | 8/2009 |
| WO | 2010/012677 A1 | 2/2010 |
| WO | 2011/015615 | 2/2011 |
| WO | 2012029051 A1 | 3/2012 |

OTHER PUBLICATIONS

Written Opinion of the International Searching Authority for PCT/EP2013/001644 dated Dec. 6, 2014 (6 pages).
International Preliminary Report on Patentability for PCT/EP2013/001644 dated Dec. 9, 2014 (6 pages).

* cited by examiner

START-UP CATALYST FOR USE UPSTREAM OF A GASOLINE PARTICULATE FILTER

The present invention describes a three-way catalyst for use in the purification of exhaust gases from gasoline engines.

It is well known in the field of combustion engines that fuel combustion is not complete and yield emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, primary measures enabled achieving decrease in the emission of pollutants. Improvement of fuel-air mixing as primary measure yielded considerable diminution of pollutants. However, due to more stringent legislations over the years, the use of heterogeneous catalysts has been made inevitable.

For gasoline engines, the so-called three-way catalyst (TWC) enables the elimination of HC, CO and $NO_x$. Optimal use of the TWC is around Lambda=1+/−0.005 where the air/fuel ratio is equal to 14.56. Above these values, the exhaust gas is said lean, and CO and HC are catalytically oxidized to carbon dioxide and water. Below this value, the exhaust gas is said rich and mainly $NO_x$ are reduced to nitrogen $N_2$ using e.g. CO as reducing agent.

Optimal conversion of HC, CO and $NO_x$ is achieved at Lambda=1. However, gasoline engines operate under oscillating conditions between slightly lean and slightly rich conditions. Under purely rich conditions, the conversion of hydrocarbon and carbon monoxide drops rapidly. In order to broaden the optimal operation of a TWC, oxygen storage material (OSM) in the form of Ce-mixed oxides were included in the formulation of the TWC.

Recently, growing interest is being paid to the emission of particulate matter (PM) from gasoline engines. Upcoming new gasoline vehicles might require the use of catalyzed gasoline particulate filter (GPF) in order to lower the emissions of PM but having also a given three-way activity for HC, CO and NO conversion. Unfortunately a GPF can not be used as a stand-alone catalyst, because it usually shows only a poor light-off performance. This results in unacceptably increased emissions of HC as HC is emitted in particular during cold-start.

Accordingly, this problem needs to be addressed and the present invention aims at improving the HC light-off performance of exhaust gas purifying systems comprising a GPF.

WO 2008000449 A2 describes a conventional double layered three-way catalyst. In this invention, the first layer contains an active aluminum oxide and a first Ce/Zr mixed oxide, both being activated with palladium. The second layer contains an active aluminum oxide and a second Ce/Zr mixed oxide, both activated with rhodium. The specificity of the invention is that the ratio Ce/Zr of the first mixed oxide is higher than the ratio Ce/Zr of the second mixed oxide.

WO 2008/113445 A1 also discloses a double layered three-way catalyst wherein both layers comprise active alumina, Ce/Zr mixed oxide and palladium. The layers differ in that the second layer comprises rhodium in addition to platinum and in that the ratio Ce/Zr of the first layer mixed oxide is higher than the ratio Ce/Zr of the second layer mixed oxide.

U.S. Pat. No. 6,044,644 and U.S. Pat. No. 6,254,842 disclose a close-coupled catalyst which has been designed to reduce hydrocarbon emissions from gasoline engines during cold starts. It comprises components of the type used in a TWC catalyst composition except that there is substantially no cerium oxide and praseodymium oxide.

EP 2042225 A1 describes a system comprising a three-way catalyst upstream of a catalytic gasoline particulate filter. In order to achieve an optimal filtration, the TWC upstream of the GPF contains less than 100 g/L of oxygen-storage material.

Systems comprising a three-way catalyst upstream of a GPF are also disclosed in US2009/193796 and US2011/030346.

The present invention provides a double-layer three-way catalyst on an inert catalyst support comprising a first layer on the inert catalyst support, comprising active alumina, a cerium/zirconium mixed oxide and palladium as a catalytically active noble metal and a second layer applied to the first layer and in direct contact with the exhaust gas to be purified, comprising active alumina and rhodium as a catalytically active noble metal, characterized in that the second layer is free of cerium and cerium containing materials and does not contain any catalytically active noble metal besides rhodium.

The first layer may comprise platinum and/or rhodium as additional catalytically active noble metals besides palladium.

In a preferred embodiment of the present invention platinum is present in the first layer besides palladium.

In a further preferred embodiment of the present invention the first layer does not contain any catalytically active noble metal besides palladium.

The catalytically active noble metals are used in amounts that are selected in view of the specific operation requirements and depend on the desired pollutant conversions. Typically, palladium is used in amounts of 0.1 to 15 g/L based on the volume of the inert catalyst support. The concentration of rhodium is typically from 0.01 to 1 g/L, based on the volume of the inert catalyst support. If platinum is present in the first layer the amounts typically used are from 0.01 to 1 g/L, based on the volume of the inert catalyst support.

The catalytically active noble metals are deposited on one or more of the other components of the catalyst. For example, the catalytically active noble metal of the first layer can be deposited on the active alumina or on the cerium/zirconium mixed oxide or on both.

The active alumina of the first and second layers is usually stabilized by doping with 1 to 10%, preferably 3 to 6% and more preferably 3.5 to 4.5%, by weight of lanthanum oxide, based on the total weight of the alumina.

The cerium/zirconium mixed oxide used in the first layer is characterized by a weight ratio of cerium oxide to zirconium oxide. Such weight ratio can vary within broad limits and depend on the specific technical task the catalyst is supposed to solve. Typically the weight ratio of cerium oxide to zirconium oxide is from 0.1 to 1.2 and preferably from 0.8 to 1.2.

The cerium/zirconium mixed oxide is preferably used in amounts of 40 to 60 g/L, based on the volume of the inert catalyst support.

For the purposes of the present invention the term "free of cerium and cerium containing materials" means that the second layer of the inventive catalyst doesn't contain significant amounts of cerium or cerium containing materials. However, this term doesn't mean that the second layer of the inventive catalyst may not contain small amounts of cerium or cerium containing materials which may be present in form of impurities or which may have migrated from the first into the second layer.

In a preferred embodiment of the present invention the second layer comprises a neodymium/zirconium mixed oxide.

The weight ratio of neodymium oxide to zirconium oxide in such mixed oxides is preferably from 0.2 to 0.5.

The neodymium/zirconium mixed oxide is preferably used in amounts of 50 to 80 g/L, based on the volume of the inert catalyst support.

In case a neodymium/zirconium mixed oxide is present in the second layer rhodium can be deposited on the active alumina or on the neodymium/zirconium mixed oxide or on both. Preferably, the rhodium is deposited on both, the active alumina and the neodymium/zirconium mixed oxide.

In a further embodiment of the present invention, the second layer completely covers the first layer. In this case, the first layer is not in direct contact with the exhaust gas to be purified.

In an additional embodiment of the present invention, the catalyst of the present invention comprises an intermediate layer between the inert catalyst support and the first layer. Typically, said intermediate layer comprises active alumina and is free of platinum group metals. The intermediate layer is preferably used in amounts of 20 to 60 g/L based on the volume of the inert catalyst support.

Preferred inert catalyst supports are monoliths of ceramic or metal with a volume V, which have parallel flow channels for the exhaust gases of the internal combustion engine. The wall surfaces of the flow channels are coated with the two layers according to the present invention. Preferably, the inert catalyst support is a flow-through monolith having a honeycomb-structure.

The inventive catalyst can be manufactured by known methods. In particular the layers are coated onto the support by means of a wash-coating process. Accordingly, the solids intended for a particular layer are suspended in water. In case of the first layer, these are active aluminum oxide and a cerium/zirconium mixed oxide. Palladium and optionally platinum and/or rhodium are deposited onto these materials proceeding from noble metal salts soluble in water. In case of palladium it is preferred to use palladium nitrate in the process described in U.S. Pat. No. 6,103,660, using barium hydroxide or strontium hydroxide as the base. The suspension thus obtained can immediately be used to coat the catalyst support. The layer applied is subsequently dried and optionally calcined.

The use of barium hydroxide or strontium hydroxide as the base for the precipitation of palladium nitrate leads, after final calcination, to barium oxide or strontium oxide remaining, having been deposited on the surface of the active aluminum oxide and of the cerium/zirconium mixed oxide.

In case a mixture of catalytically active noble metals is used in the first layer, it is possible to accomplish the deposition of all metals of the mixture simultaneously in one operation or successively in different operations.

Thereafter, the second coating is applied. To this end, active aluminum oxide and optionally neodymium/zirconium mixed oxide are suspended in water, and rhodium is deposited thereon. This can be achieved by supplying rhodium nitrate.

Finally, the support carrying the first and second layer is dried and calcined and is then ready for use.

Alternatively to the procedure described, the catalytically active noble metals can also be deposited separately on any solid component of the catalyst. Only thereafter are, for example, palladium-activated aluminum oxide and palladium-activated cerium/zirconium mixed oxide suspended together in water and applied to the catalyst support. Such a procedure enables the concentration of the catalytically active noble metals on aluminum oxide on the one hand, and for example cerium/zirconium mixed oxide or neodymium/zirconium mixed oxide on the other hand, to be established in a controlled manner. For the separate deposition of the noble metals onto aluminum oxide and zirconium mixed oxides, preference is given to using the process described in EP 957064.

The catalysts of the present invention are suitable as three-way catalyst for cleaning exhaust gases of a motor vehicle equipped with a gasoline engine and can for this purpose be used in a manner known to the skilled person.

Accordingly, the present invention further provides the use of the catalyst of the present invention for cleaning the exhaust gases of a motor vehicle equipped with a gasoline engine.

While the inventive catalyst can be used as underfloor main catalyst, it is of particular advantage to use the catalysts of the present invention as a start-up catalyst upstream of a gasoline particulate filter (GPF). In this configuration the inventive catalysts solve the problem described above, i.e. the HC emissions during cold-start of a vehicle equipped with a GPF can be sufficiently reduced.

Accordingly, the present invention further provides an exhaust gas treatment system comprising an inventive catalyst as described above and a gasoline particulate filter (GPF). The skilled person knows and understands that the inventive exhaust gas treatment system solves the problem described above only if the inventive catalyst is located upstream of the GPF.

The selection of the GPF to be used in the inventive exhaust gas treatment system is not critical and depends on the specific technical problem to be solved. Suitable GPFs are described for example in EP 2042225 A1 and US 2011/030346.

In a preferred embodiment of the present invention, the gasoline particulate filter is a wall-flow monolith having a honeycomb-structure.

EXAMPLES

For the testing of the present invention, round cordierite substrates were used with a diameter of 101.6 mm and a length of 101.6 mm. Cell density was 600 cpsi, and the wall thickness was 4.3 mil.

Comparative Example A

A double-layered three-way catalyst according to WO 2008/000449 A2 was used as reference sample and was prepared according to the recipe described in said publication as follows:

a) For the first layer, an aqueous suspension was prepared by mixing a lanthanum oxide stabilized alumina containing 3 wt. % $La_2O_3$ and having a specific surface area of 140 $m^2/g$, with a first Ce/Zr mixed oxide having a $ZrO_2$ content of 50% and strontium hydroxide as basic component. $Pd(NO_3)_2$ was used as noble metal precursor and was deposited on all oxides. After finalizing the suspension, the raw cordierite substrate was coated with the first layer followed by a drying step. After calcination, the composition of the first layer is:

| | |
|---|---|
| 80 g/L | La-stabilized alumina |
| 55 g/L | first Ce/Zr-mixed oxide |
| 10 g/L | strontium oxide (on all components) |
| 2.72 g/L | palladium (on all components) | b) For the second layer an aqueous suspension containing lanthanum oxide stabilized alumina (3 wt. % $La_2O_3$, specific surface area=140 $m^2/g$) and a second Ce—Zr mixed oxide having a $ZrO_2$ content of 70% was prepared. A $Rh(NO_3)_2$ aqueous solution was injected into the suspension. The second layer was coated on top of the first layer. After a drying step and a calcination step, the composition of the second layer was:

| | |
|---|---|
| 70 g/L | La-stabilized alumina |
| 65 g/L | second Ce/Zr-mixed oxide |
| 0.11 g/L | rhodium (on all components) |

In the test described below the resulting catalyst is called CC1.

Example 1 a) The first layer in contact with the cordierite substrate was prepared exactly as described in step a) of the Comparative Example A and consequently had the identical composition.

b) For the second layer an aqueous suspension was prepared comprising lanthanum oxide stabilized alumina (3 wt. % $La_2O_3$, specific surface area=140 $m^2/g$) and a Zr/Nd mixed oxide with a $ZrO_2$ content of 73%. A $Rh(NO_3)_2$ aqueous solution was injected into the suspension. The second layer was coated on top of the first layer. After a drying step and a calcination step, the composition of the second layer was:

| | |
|---|---|
| 66 g/L | La-stabilized alumina |
| 68 g/L | Zr/Nd mixed oxide |
| 0.11 g/L | rhodium (on all components) |

In the test described below the resulting catalyst is called C1.

The catalysts of the Comparative Example A (CC1) and Example 1 were compared in two tests:

First test: C1 and CC1 were evaluated on engine benches for light-off performance. For this test C1 and CC1 were tested as a single-brick after having been aged on an engine bench for 38 h fuel-cut.

Exhaust gas upstream of the sample contained 450 ppm HC, 3000 ppm $NO_x$ and 0.79% CO for an exhaust flow of 110 Kg/h. The lambda value before catalyst was set at 0.999.

Catalytic activity was tested between 250° C. and 500° C. at a temperature rate of 22° C./min.

The following results were obtained:

| | Light-off temperature (° C.) | | |
|---|---|---|---|
| | THC | CO | $NO_x$ |
| C1 according to the invention | 399 | 409 | 410 |
| CC1 according to prior art | 412 | 420 | 423 |

After aging, C1 according to the present invention showed a stupendous improvement in activity compared CC1 according to prior art, exhibiting a much lower light-off for all three HC, CO and $NO_x$ pollutants.

Second test: The NEDC cycle was run with C1 and CC1 in combination with a gasoline particulate filter on an engine bench. For these tests, a GPF containing 0.071 g/L palladium and 0.035 g/L rhodium was used. The diameter of the GPF was 118.4 mm, with a length of 152.4 mm. Cell density and wall thickness were respectively 300 cpsi and 12 mil. The distance between the light-off catalyst (C1 and CC1, respectively) and the gasoline particulate filter was set at 50 cm. For the purpose of the testing, the lambda control sensor was positioned between the light-off catalyst and the GPF. The engine used to run the NEDC cycle was a 1.4 L direct injection engine with a Euro 4 calibration.

Prior to testing the C1, CC1 and the gasoline particulate filter were aged on an engine bench for 38 h fuel-cut.

The following results were obtained:

| | Total emissions (mg/km) emitted during NDEC cycle downstream of the system TWC + GPF | | |
|---|---|---|---|
| | THC | CO/10 | $NO_x$ |
| C1 according to the invention | 92 | 63 | 65 |
| CC1 according to prior art | 105 | 56 | 63 |

While the CO and NOx emissions are nearly identical for C1 and CC1, the HC emissions are considerably lower when C1 according to the present invention is used as TWC in the front brick.

Comparative Example B

A double-layered three-way catalyst was prepared as follows:

a) For the first layer, an aqueous suspension was prepared by mixing a lanthanum oxide stabilized alumina containing 3 wt. % $La_2O_3$ and having a specific surface area of 140 $m^2/g$, with 50% and barium hydroxide as basic component. $Pd(NO_3)_2$ was used as noble metal precursor and was deposited on all oxides. After finalizing the suspension, the raw cordierite substrate was coated with the first layer followed by a drying step. After calcination, the composition of the first layer is:

| | |
|---|---|
| 110 g/L | La-stabilized alumina |
| 10 g/L | barium oxide |
| 2.72 g/L | palladium (on all components) | b) For the second layer an aqueous suspension containing lanthanum oxide stabilized alumina (3 wt. % $La_2O_3$, specific surface area=140 $m^2/g$) and a Ce—Zr mixed oxide having a $ZrO_2$ content of approx. 70% was prepared. A $Rh(NO_3)_2$ aqueous solution was injected into the suspension. The second layer was coated on top of the first layer. After a drying step and a calcination step, the composition of the second layer was:

| | |
|---|---|
| 70 g/L | La-stabilized alumina |
| 65 g/L | Ce/Zr-mixed oxide |
| 0.11 g/L | rhodium (on all components) |

In the test described below the resulting catalyst is called CC2. As C1 CC2 was tested after having been aged on an engine bench for 38 h fuel-cut.

In order to compare C1 and CC2 the NEDC cycle as described above was run. The results obtained for CC2 were set to 100% and the results obtained for C1 were related thereto.

The following results were obtained:

|  | Normalized emissions (%) emitted during NDEC cycle downstream of the system TWC + GPF | | |
| --- | --- | --- | --- |
|  | THC | CO | $NO_x$ |
| C1 according to the invention | 94 | 114 | 104 |
| CC2 according to prior art | 100 | 100 | 100 |

Again, the HC emissions are considerably lower when C1 according to the present invention is used as TWC in the front brick.

The invention claimed is:

1. A double-layer three-way catalyst on an inert catalyst support, comprising:
   a first layer on the inert catalyst support, comprising active alumina, a cerium/zirconium mixed oxide and palladium as a catalytically active noble metal; and
   a second layer applied to the first layer and in direct contact with the exhaust gas to be purified, comprising active alumina and rhodium as a catalytically active noble metal, wherein
   the second layer is free of cerium and cerium containing materials and does not contain any catalytically active noble metal besides rhodium, and
   the weight ratio of cerium oxide to zirconium oxide in the cerium/zirconium mixed oxide of the first layer is from 0.1 to 1.2.

2. The double-layer three-way catalyst according to claim 1, wherein the first layer does not contain any catalytically active noble metal besides palladium.

3. The double-layer three-way catalyst according to claim 1, wherein the second layer comprises a neodymium/zirconium mixed oxide.

4. The double-layer three-way catalyst according to claim 3, wherein the rhodium in the second layer is deposited on both active alumina and neodymium/zirconium mixed oxide.

5. The double-layer three-way catalyst according to claim 3, wherein the weight ratio of neodymium oxide to zirconium oxide in the neodymium/zirconium mixed oxide of the second layer is from 0.2 to 0.5.

6. The double-layer three-way catalyst according to claim 1, wherein the second layer completely covers the first layer.

7. The double-layer three-way catalyst according to claim 1, further comprising an intermediate layer between the inert catalyst support and the first layer.

8. The double-layer three-way catalyst according to claim 7, wherein the intermediate layer comprises active alumina and is free of platinum group metals.

9. The double-layer three-way catalyst according to claim 1, wherein the inert catalyst support is a flow-through monolith having a honeycomb-structure.

10. A process for cleaning exhaust gas of a motor vehicle equipped with a gasoline engine comprising contacting the exhaust gas with the double-layer three-way catalyst according to claim 1.

11. An exhaust gas treatment system comprising the double-layer three-way catalyst according to claim 1 and a gasoline particulate filter (GPF).

12. The exhaust gas treatment system according to claim 11, wherein the gasoline particulate filter is a wall-flow monolith having a honeycomb-structure.

* * * * *